Patented June 18, 1940

2,204,812

UNITED STATES PATENT OFFICE 2,204,812

COMPOSITION OF MATTER AND METHOD OF USING SAME

Irving E. Muskat, Akron, Ohio, assignor to Pittsburgh Plate Glass Company, Allegheny County, Pa., a corporation of Pennsylvania No Drawing. Application February 3, 1938, Serial No. 188,577

5 Claims. (Cl. 210—2)

This invention relates to the clarification of water and to flocculating agents which assist such clarification. The removal of solid suspended matter, such as sewage, from aqueous liquors often is a very slow process unless agencies tending to promote more rapid clarification are resorted to. Prior to this invention, it has been the practice to treat aqueous suspensions such as sewage sludges with certain chemical flocculating agents, such as ferric chloride in order to facilitate the removal of the solid matter suspended therein.

In accordance with my invention, I have found that the presence of a titanium chloride, such as titanium tetrachloride, assists the flocculating action of ferric chloride and permits a more complete and more rapid removal of solids suspended in aqueous liquors than is possible with ferric chloride alone. In addition, the presence of the titanium appears to greatly assist in decolorizing these liquors. Thus, I find that a very effective clarification and decolorizing of aqueous sludges such as sewage may be secured by concurrent treatment with an iron chloride, such as ferric chloride and a titanium chloride such as titanium tetrachloride. The two agents may be separately added to the sludge or they may be mixed to form a coagulating composition and added to the sludge as a mixture.

The relative concentration of titanium tetrachloride used in the composition may be varied considerably but in general, should not be in such excess that the composition is a liquid in which the ferric chloride is suspended. In most cases, the concentration of the titanium tetrachloride used should not exceed 20 per cent by weight of the total composition and it is preferred that the concentration be below 10 per cent.

Titanium tetrachloride in concentrations as low as 0.5 per cent appears to have a beneficial effect upon the action of iron chloride and concentrations in excess of 20 per cent appear to have some value.

Both ferric and ferrous iron may be used as coagulents but it has been found that ferric chloride is a more effective coagulent than ferrous chloride. In a similar manner, titanium trichloride or titanium dichloride may be used in the composition although titanium tetrachloride appears to be the most suitable. Similarly, other hydrolyzable titanium compounds, such as hydroxide, oxychloride and hydroxychloride of titanium may also be used.

Treatment with my composition may be carried out with liquids having widely varying hydrogen concentrations, the conditions of operation being similar to those used with ferric chloride alone. Operation within a pH range of 3.5–9.5 appears to yield superior results however. The pH of the liquor to be treated may, if desired, be adjusted before treatment, by any convenient means as, for example, by addition of lime or carbon dioxide.

The following examples are illustrative:

*Example I.*—A sewage sludge having an average solid content of about 510 parts per million was adjusted to a pH of 5.5 and treated with 5 grains per gallon of a composition containing 10 per cent titanium tetrachloride, the balance being ferric chloride and allowed to settle for 8 hours. Over 97 per cent of the suspended solids were removed.

*Example II.*—The pH of a brown-colored aqueous liquor containing 300 parts per million of suspended solids was adjusted to 8 and was treated with 10 grains per gallon of a composition containing 15 per cent titanium tetrachloride and the balance ferric chloride, and the mixture was allowed to settle. Approximately 98 per cent of the solids were removed and the supernatant liquid was very clear.

The concentration of the ferric chloride and titanium tetrachloride necessary is dependent largely upon amount and character of the materials present. In general, a total of less than about 15–20 grains of the two compounds per gallon of sewage or other aqueous suspension is found to be necessary although larger concentrations may be used if desired.

The process may be used to clarify or decolorize various types of aqueous liquors. Thus, sewage, industrial wastes, sugar solutions, leaching solutions obtained from ore recovery processes, etc., may be treated in this manner with my composition.

Although the invention has been described with reference to the specific details of certain embodiments thereof, it is not intended that such details shall be regarded as limitations upon the scope of the invention except insofar as included in the accompanying claims.

I claim:

1. A composition of matter suitable for use as a flocculation agent comprising ferric chloride as a major constituent thereof and about 0.5 to 10 per cent of titanium tetrachloride.

2. A composition of matter suitable for use as a flocculation agent comprising ferric chloride as a major constituent thereof and up to 20 per cent by weight of titanium tetrachloride.

3. A composition of matter suitable for use as a flocculation agent comprising an iron chloride as a major constituent thereof and up to about 20 percent of a titanium chloride.

4. The method of removing suspended solids from aqueous dispersions thereof which comprises treating said dispersions with ferric chloride and up to about 20 percent of titanium tetrachloride based upon the total weight of ferric and titanium chlorides introduced into the dispersion.

5. The method of removing suspended solids from aqueous dispersions thereof which comprises treating said dispersions with an iron chloride and up to about 20 percent of a titanium chloride based upon the total weight of ferric and titanium chlorides introduced into the dispersion.

IRVING E. MUSKAT.